United States Patent
Song et al.

(10) Patent No.: US 11,693,110 B2
(45) Date of Patent: Jul. 4, 2023

(54) SYSTEMS AND METHODS FOR RADAR FALSE TRACK MITIGATION WITH CAMERA

(71) Applicant: Ford Global Technologies, LLC, Dearborn, MI (US)

(72) Inventors: Xiufeng Song, San Jose, CA (US); Avinash Ajit Nargund, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 17/088,763

(22) Filed: Nov. 4, 2020

(65) Prior Publication Data

US 2022/0137207 A1     May 5, 2022

(51) Int. Cl.
| | |
|---|---|
| *G01S 13/86* | (2006.01) |
| *G01S 13/72* | (2006.01) |
| *G01S 13/931* | (2020.01) |
| *G01S 13/00* | (2006.01) |

(52) U.S. Cl.
CPC .......... *G01S 13/867* (2013.01); *G01S 13/723* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 3,864,678 | A * | 2/1975 | Yamanaka | B60R 21/013 342/107 |
| 5,909,189 | A * | 6/1999 | Blackman | G01S 13/726 342/96 |
| 6,278,401 | B1 * | 8/2001 | Wigren | G01S 7/021 342/115 |
| 8,976,059 | B2 * | 3/2015 | Dizaji | G01S 13/5244 342/159 |
| 2003/0100982 | A1 * | 5/2003 | Rao | B60R 21/013 180/274 |
| 2003/0220728 | A1 * | 11/2003 | Rao | B60R 21/013 340/436 |
| 2004/0111200 | A1 * | 6/2004 | Rao | B60R 21/013 701/45 |

(Continued)

FOREIGN PATENT DOCUMENTS

WO     2020176483 A1     9/2020

OTHER PUBLICATIONS

Yang, F. et al. "A Novel Track Initialization Algorithm Based on Random Sample Consensus in Dense Clutter," International Journal of Advanced Robotic Systems, Nov.-Dec. 2018, pp. 1-11.

*Primary Examiner* — Bernarr E Gregory
(74) *Attorney, Agent, or Firm* — Frank MacKenzie; Brooks Kushman, P.C.

(57) ABSTRACT

Systems and methods for operating radar systems. The methods comprise, by a processor: receiving point cloud information generated by at least one radar device; generating a radar track initializer using the point cloud information; determining whether the radar track initializer includes false information; generating a radar track for a detected object when a determination is made that the radar track initializer does not include false information; and/or using the radar track to control operations of a vehicle.

20 Claims, 9 Drawing Sheets

(56) References Cited

U.S. PATENT DOCUMENTS

| | | | |
|---|---|---|---|
| 2008/0111730 A1* | 5/2008 | Ding | G01S 13/726 |
| | | | 342/90 |
| 2010/0191391 A1* | 7/2010 | Zeng | G01S 13/931 |
| | | | 701/1 |
| 2015/0054673 A1* | 2/2015 | Baba | G01S 13/931 |
| | | | 342/27 |
| 2020/0049511 A1 | 2/2020 | Sithiravel et al. | |
| 2020/0124716 A1 | 4/2020 | Millar et al. | |
| 2020/0218913 A1 | 7/2020 | Unnikrishnan et al. | |

* cited by examiner

SYSTEMS AND METHODS FOR RADAR FALSE TRACK MITIGATION WITH CAMERA

BACKGROUND

Statement of the Technical Field

The present disclosure relates generally to radar systems. More particularly, the present disclosure relates to implementing systems and methods for radar false track mitigation with camera instance segments.

Description of the Related Art

Radar systems are often used for detecting the presence, direction, distance and speed of objects. The objects can include vehicles, ships, aircrafts, pedestrians, animals, trees and/or buildings. During operations, a radar system emits a signal that is reflected off of an object back towards the radar systems. The reflected signal is received by the radar system. The received signal provides information about the object's location and speed. For example, if an object is moving either toward or away from the radar system, the received signal will have a slightly different frequency than the frequency of the emitted signal due to the Doppler effect.

SUMMARY

The present disclosure concerns implementing systems and methods for operating a radar system. The methods comprise performing the following operations by a processor: receiving point cloud information generated by at least one radar device; generating a radar track initializer using the point cloud information; determining whether the radar track initializer includes false information; generating a radar track for a detected object when a determination is made that the radar track initializer does not include false information; and using the radar track to control operations of a vehicle.

In some scenarios, the radar track initializer is discarded when a determination is made that the radar track initializer includes false information. The method may also comprise: computing a distance from the radar track initializer to a known location of the vehicle; comparing the distance to a threshold value; and/or determining whether the radar track initializer includes false information when the distance is equal to or less than the threshold value.

The determination as to whether the radar track initializer includes false information is made by: determining a first position of the radar track initializer at an image capture time; converting the first position from a sensor frame format to a world frame format to obtain a second position; projecting the second position to a camera frame; using the projected second position to determine a distance between the radar track initializer and each of a plurality of camera segments; selecting a camera segment from the plurality of camera segments that is closest to the radar track initializer; determining whether a distance between the radar track initializer and the selected camera segment is greater than a threshold value; and/or concluding that the radar track initializer contains false information when the distance is greater than the threshold value.

BRIEF DESCRIPTION OF THE DRAWINGS

The present solution will be described with reference to the following drawing figures, in which like numerals represent like items throughout the figures.

DETAILED DESCRIPTION

Figure 1:
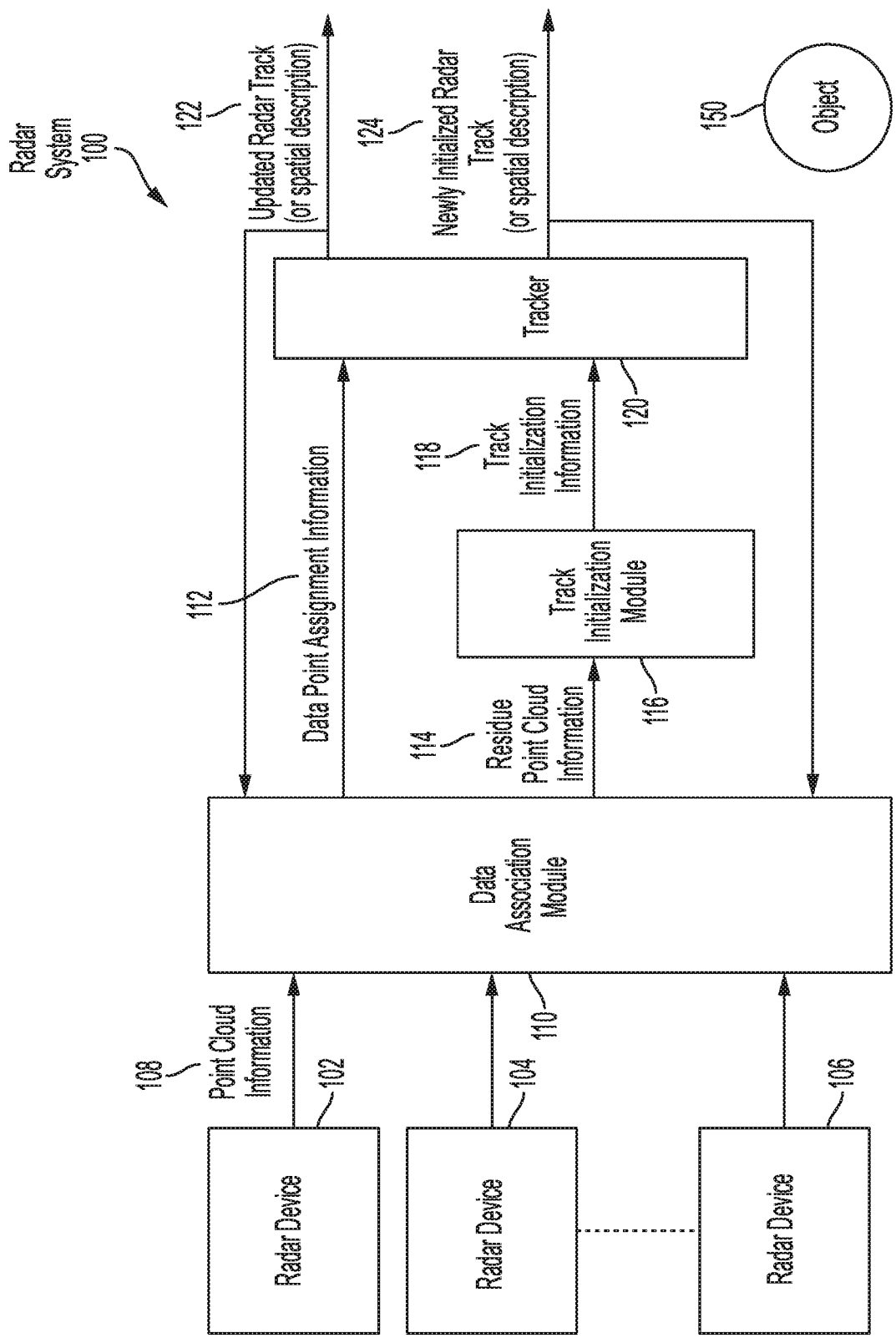
FIG. 1 provides an illustration of an illustrative radar system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The terms "track" and "radar track" generally refer to a spatial description that identifies an object by its kinematics and/or classification attributes. A track and radar track may include, without limitation, a location (e.g., an x-coordinate, a y-coordinate and/or a z-coordinate), a range-rate, and a velocity (e.g., speed plus a direction of travel) for each data point of a point cloud that is associated with the object. Techniques for generating tracks may include, without limitation, using a track filter. The track filter can include, but is not limited to, a Kalman filter, an extended Kalman filter, an unscented Kalman filter, and/or a particle filter.

The term "radar track initializer" generally refers to one or more values that are used to initialize an algorithm for generating a track or radar track. For example, the radar track initializer can include one or more initialization input values for a track filter. The track filter may be initialized on the first detection of an object. The detection produces point cloud information which includes for each data point, without limitation, an x-coordinate, a y-coordinate, a covariance metric of x and y, a range, a velocity in the x-direction, a velocity in the y-direction, a covariance metric of the velocity in the x-direction, a covariance of the velocity in the y-direction, and/or an azimuth measurement for a detected object. One or more of these listed values may be used as input values to initialize the track filter. As such, a radar track initializer can include, but is not limited to, an x-coordinate, a y-coordinate, a covariance metric of x and y, a range, a velocity in the x-direction, a velocity in the y-direction, a covariance metric of the velocity in the x-direction, a covariance of the velocity in the y-direction, and/or an azimuth measurement for a detected object.

Most conventional radar systems do not validate whether a radar track initializer contains false information. The conventional radar systems that do perform a validation process simply (i) evaluate an evolution of a radar track and (ii) discard the radar track when certain conditions exist in its evolution. A radar track generally refers to a data set which identifies a particular object by its kinematics (i.e., position, direction and motion) and attributes of classification. This approach is computationally intensive since a radar track is generated using all radar track initializers. Since false radar track initializers are used to generate radar tracks, errors propagate through the radar system and the false radar tracks can cause problems on the consumer side. Thus, the present solution is designed to address these issues of false radar tracks.

The present solution concerns implementing systems and methods for radar false track mitigation with camera instance segments. The methods generally involve: receiving point cloud information generated by radar device(s); and assigning data points contained in the point cloud information to existing radar tracks (or spatial descriptions) for detected objects. Each radar track (or spatial description) may include, but is not limited to, the following information for each data point: an x-coordinate, a y-coordinate, a covariance metric of x and y, a velocity of x, a velocity of y, a covariance metric of the velocity of x, and/or a covariance metric of the velocity of v. The existing radar tracks (or spatial descriptions) are updated based on the data points assigned thereto. The system: identifies data points of the point cloud information that were not assigned to existing radar tracks ("residue point cloud information"); and determines radar tracks (or spatial descriptions) for assumed newly detected object(s) using the residue point cloud information. The radar tracks are determined by: generating radar track initializers using the residue point cloud information; determining which radar track initializers include false information; discarding radar track initializers which include false information; passing remaining radar track initializers (i.e., those absent of false information or those that contain true information) to a tracker; and using, by the tracker, the remaining radar track initializers to initialize at least one radar track (or spatial description) for an assumed newly detected object.

A determination as to whether a radar track initializer includes false information is made in accordance with the following algorithm. First, the system computes a distance of the radar track initializer to the vehicle having a known location. The computed distance is compared to a first threshold value. If the distance is greater than the first threshold value, then the system is not sure that radar and camera detections were made simultaneously. Thus, the camera information cannot be used to confidently validate a radar track initializer. In this case, the radar track initializer is used to generate a radar track.

If the distance is equal to or less than the first threshold value, then the camera information can be used to confidently validate a radar track initializer. In this case, the system performs various operations to determine whether the radar track initialize includes false information. These operations involve: determining a first track position (e.g., a 2D position) in a sensor frame by resolving a time misalignment between a camera image and the radar track initializer (e.g., by compensating timing of the radar track initializer to a capture time of an image); determining a second track position (e.g., a 3D position) using the first track position, a ground height of a road map and/or a pre-defined fixed delta value; expanding the second track position into multiple third track positions; projecting the third track positions from a world frame to a camera frame to obtain a plurality of projected data points (where each projected data point is defined by a u-coordinate and a v-coordinate); determining a distance between each projected data point to each of a plurality of camera segments; using the distances to compute an average distance from the radar track initializer position to each given camera segment; using the average distances to identify a camera segment that is closest to the radar track initializer position; and comparing the average distance (between the tracker initializer position and the identified camera segment) to a second threshold value for the identified closest camera segment. If the average distance is greater than the second threshold value, then the system concludes that the radar track initializer contains false information.

Illustrative Radar Systems

The present solution concerns a radar system for detecting the presence, direction, distance and speed of objects, which may include moving actors, stationary objects, or both. The objects can include vehicles, ships, aircrafts, pedestrians, animals, trees and/or buildings. An illustration of an illustrative radar system 100 is provided in FIG. 1. As shown in FIG. 1, the radar system 100 comprises a plurality of radar devices 102, 104, 106. Although three radar devices are shown in FIG. 1. The present solution is not limited in this regard. The radar system can include any number of radar devices selected in accordance with a given application. An illustrative architecture for a radar device will be discussed below in relation to FIG. 2. The radar system 100 also comprises a data association module 110, a track initialization module 116 and a tracker 120. The data association module 110, track initialization module 116 and/or tracker 120 can include, but is(are) not limited to, a computing device such as that shown in FIG. 8. Data association modules and trackers are well known in the art.

During operation, each radar device 102, 104, 106 emits a signal that is reflected off of an object 150 back towards the radar device. The reflected signal is received by the radar device 102, 104, 106. The received signal provides information about the object's location and speed. For example, if the object 150 is moving either toward or away from the radar system 100, the received signal will have a slightly different frequency than the frequency of the emitted signal due to the Doppler effect. The radar device processes the received signal and generates a point cloud including a plurality of data points. Point clouds are well known in the art. Point cloud information 108 is communicated from the radar device(s) to the data association module 110. The point cloud information 108 includes, but is not limited to, a signal strength, a range value, a range-rate value, a range-rate angle value, a range-rate amplitude value, an velocity ambiguity, a Signal-to-Noise Ratio (SNR), a Radar Cross-Section (RCS), uncertainties and/or a moduli for each point in the point cloud. The range-rate value indicates a rate that the object 150 moves toward or away from the radar system 100. For example, a negative range-rate value indicates that the object 150 is moving away from the radar system 100 at a certain velocity, while a positive range-rate value indicates that the object 150 is moving towards the radar system 100 at a certain velocity. The present solution is not limited to the particulars of this example.

The data association module 110 performs operations to assign data points contained in the point cloud information 108 to existing radar tracks (or spatial descriptions) for detected objects. The association could be either implemented as a point-to-track association or a segment-to-track association. In the point-to-track association scenarios, the data association module 110 computes a distance from a radar detection point (or data point) to all radar tracks, and then assigns the radar detection point to the closest radar track if the distance is smaller than a given threshold. The distance includes both the position and the motion information. If the closest distance is greater than the given threshold, then the data association module 110 does not associate the radar detection point to any existing radar tracks. This unassociated radar detection point is now considered a residue point cloud information. The residue radar detection points are subsequently used to initialize new radar tracks. All radar detection points that have been assigned to a given existing track form a segment. In the segment-to-track association scenario, the data association module 110 segments the point cloud, and then attempts to associate the segments to the existing radar tracks. Similarly, the data association module 110 computes the distance from a segment to all radar tracks, compares the distances to a given threshold, and associates a segment with a given existing track when the distance is less than the given threshold.

Radar tracks (or spatial descriptions) are well known. Each radar track (or spatial description) may include, but is not limited to, the following information for each data point of one or more point clouds: an x-coordinate, a y-coordinate, a z-coordinate, a covariance metric of x and y, a velocity of x, a velocity of y, a covariance metric of the velocity of x, and/or a covariance metric of the velocity of v. In some scenarios, the z-coordinate represents a default height or a height based on ground.

Data point assignment information 112 is communicated from the data association module 110 to the tracker 120. The data point assignment information 112 is used by the tracker 120 to update the existing radar tracks (or spatial descriptions) based on the data points assigned thereto. The updated radar tracks (or spatial descriptions) 122 are output from the tracker 120. The updated radar tracks (or spatial descriptions) 122 may, for example, be used to control autonomous driving operations of a vehicle as described below.

The data association module 114 also communicates residue point cloud information 114 to the track initialization module 116. The residue point cloud information 114 identifies data points of the point cloud information 108 that were not assigned to existing radar tracks. Module 116 generates or determines radar track initializers that are to be used by the tracker 120 to generate new radar tracks (or spatial descriptions) for assumed newly detected object(s). Module 116 generates/determines the radar track initializers by: generating radar track initializers using the residue point cloud information 114; determining which radar track initializers include false information; and discarding radar track initializers which include false information. The remaining radar track initializers (i.e., those absent of false information) are communicated from module 116 to tracker 120 as track initialization information 118.

The tracker 120 uses the track initialization information 118 to initialize at least one radar track (or spatial description) 124 for an assumed newly detected object. The radar track (or spatial description) 124 includes, but is not limited to, a location (e.g., an x-coordinate and a y-coordinate), a range-rate, and a velocity (i.e., speed plus a direction of travel) for each data point of the point cloud that is associated with the assumed newly detected object. The radar track can be generated in accordance with any known or to be known technique. For example, in some scenario, the radar track is generated using a track filter (e.g., a Kalman filter) that is initialized via the track initialization information. The present solution is not limited to the particulars of this example.

Figure 2:
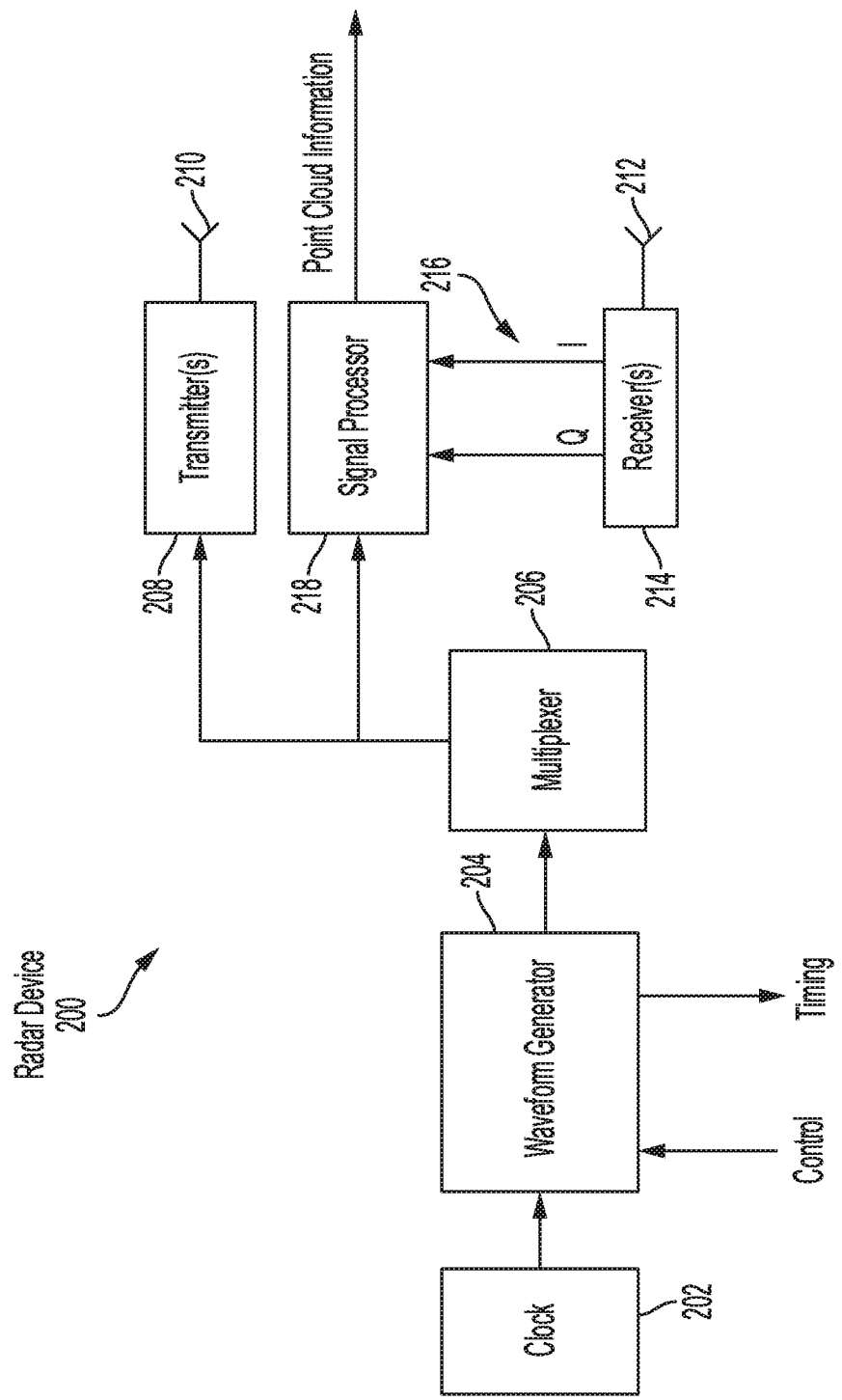
FIG. 2 provides an illustration of an illustrative radar device.

Referring now to FIG. 2, there is provided an illustration of an illustrative radar device 200. Radar devices 102, 104, 106 of FIG. 1 are the same as or similar to radar device 200. Thus, the following discussion of radar device 200 is sufficient for understanding radar devices 102, 104, 106.

As shown in FIG. 2, the radar device 200 comprises a clock 202 and a waveform generator 204. The waveform generator 204 is capable of producing a suitable waveform for range determination. The waveform can include, but is not limited to, a continuous-time signal. The radar device 200 also comprises a multiplexer 206, at least one transmitter 208, a signal processor 218, an antenna assembly (with transmitting element(s) 210 and receiving element(s) 212), and at least one receiver 214. The signal processor 130 is configured to generate point cloud information based on received signals.

During operations, the waveform generator 204 may generate a continuous-time signal. The continuous-time signal is emitted from the transmitting element 210 in a predetermined direction. The continuous-time signal may reflect off an object (e.g., object 150 of FIG. 1) back towards the radar device 200. The reflected continuous-time signal is received by the receiving element 212, and passed to the receiver 214. The received continuous-time signal provides information about the object's location and velocity. For example, if an object is moving either toward or away from the radar device 200, the received continuous-time signal will have a slightly different frequency than the frequency of the emitted continuous-time signal due to the Doppler effect. Accordingly, the receiver 214 processes the received continuous-time signal to convert the same to a discrete-time signal including a sequence of samples. Each sample of the sequence has I and Q components, and therefore is referred to herein as an IQ sample. The IQ samples are passed to the signal processor 218. The signal processor 218 uses the IQ samples to reconstruct/recover a signal, and generate point cloud information. The point cloud information includes, but is not limited to, a signal strength, a range value, a range-rate value, a range-rate angle value, a range-rate angle value, a range-rate amplitude value, an velocity ambiguity, and/or a moduli value for each point in the cloud.

Figure 3:
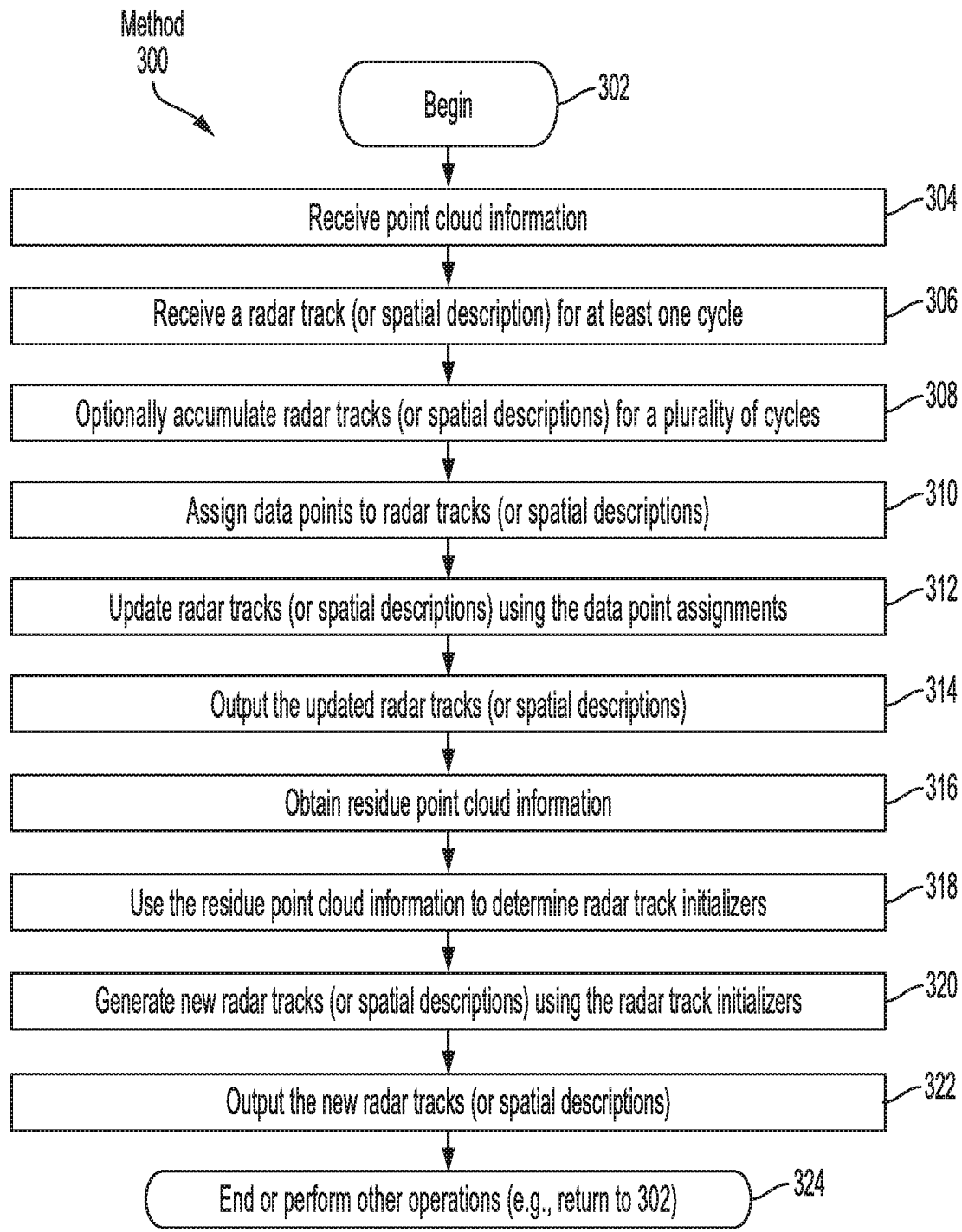
FIG. 3 provides a flow diagram for operating the radar system of FIG. 1.

Referring now to FIG. 3, there is provided an illustrative method 300 for operating a radar system (e.g., radar system 100 of FIG. 1). Method 300 begins with 302 and continues with 304 where point cloud information (e.g., point cloud information 108 of FIG. 1) is received by a data association module (e.g., data association module 110 of FIG. 1) from a plurality of radar devices (e.g., radar devices 102, 104, 106 of FIG. 1) during at least one cycle. The point cloud information defines a point cloud comprising a plurality of data points. The data association module can include, but is not limited to, a computing device (such as that described below in relation to FIG. 8).

In 306, the data association module receives a radar track (or spatial description) (e.g., radar track (or spatial description) 122, 124 of FIG. 1) for at least one cycle from a tracker (e.g., tracker 120 of FIG. 1). In some scenarios, the data association module accumulates radar tracks (or spatial descriptions) for N cycles as shown by 308, where N is an integer. The accumulated spatial descriptions can include, but are not limited to, a spatial description for a cycle $c_1$, a spatial description for a cycle $c_2$, ..., and a spatial description for a cycle $c_N$. The tracker can include, but is not limited to, a computing device (such as that described below in relation to FIG. 8).

In 310, the data association module performs operations to assign data points contained in the point cloud information to existing radar tracks (or spatial descriptions) for detected objects. Radar tracks are well known. Each radar track (or spatial description) may include, but is not limited to, the following information for each data point: an x-coordinate, a y-coordinate, a covariance metric of x and y, a velocity of x, a velocity of y, a covariance metric of the velocity of x, and/or a covariance metric of the velocity of v. Data point assignment information (e.g., data point assignment information 112 of FIG. 1) may also be communicated in 310 from the data association module to a tracker (e.g., tracker 120 of FIG. 1).

In 312, the tracker updates the existing radar tracks (or spatial descriptions) using the data point assignment information, i.e., the existing radar tracks (or spatial descriptions) are updated based on and in accordance with the data points assigned thereto. For example, the following information is added to a given radar track (or spatial description) for each data point which has been newly assigned thereto: an x-coordinate, ay-coordinate, a covariance metric of x and y, a velocity of x, a velocity of y, a covariance metric of the velocity of x, and/or a covariance metric of the velocity of v.

The updated radar tracks (or spatial descriptions) are output from the tracker in 314. In some scenarios, the radar tracks (or spatial descriptions) are received by a computing device (e.g., vehicle on-board computing device 620 of FIG. 6) of a vehicle. The computing device may then use the radar tracks (or spatial descriptions) to control operations (e.g., autonomous driving operations) of the vehicle as described below.

In 316, residue point cloud information (e.g., residue point cloud information 114 of FIG. 1) is obtained by a track initialization module (e.g., module 116 of FIG. 1). The residue point cloud information identifies data points of the point cloud information received in 304 that were not assigned to existing radar tracks (or spatial descriptions) in 310.

In 318, the track initialization module determines radar track initializers that are to be used in 320 by the tracker to generate radar tracks (or spatial descriptions) for assumed newly detected object(s). The radar track initializers are determined or generated based on the residue point cloud information. The manner in which the radar track initializers are determined/generated will become evident as the discussion progresses. In some scenarios, the new radar tracks are generated using well known track filter(s) (e.g., a Kalman track filter(s)) that is(are) initialized via the radar track initializer(s). The present solution is not limited in this regard.

The new radar tracks are output from the tracker in 322. In some scenarios, the new radar tracks (or spatial descriptions) are received by a computing device (e.g., vehicle on-board computing device 620 of FIG. 6) of a vehicle. The computing device may then use the new radar tracks (or spatial descriptions) to control operations (e.g., autonomous driving operations) of the vehicle as described below. Subsequently, 324 is performed where method 300 ends or other operations are performed (e.g., return to 302).

Figure 4:
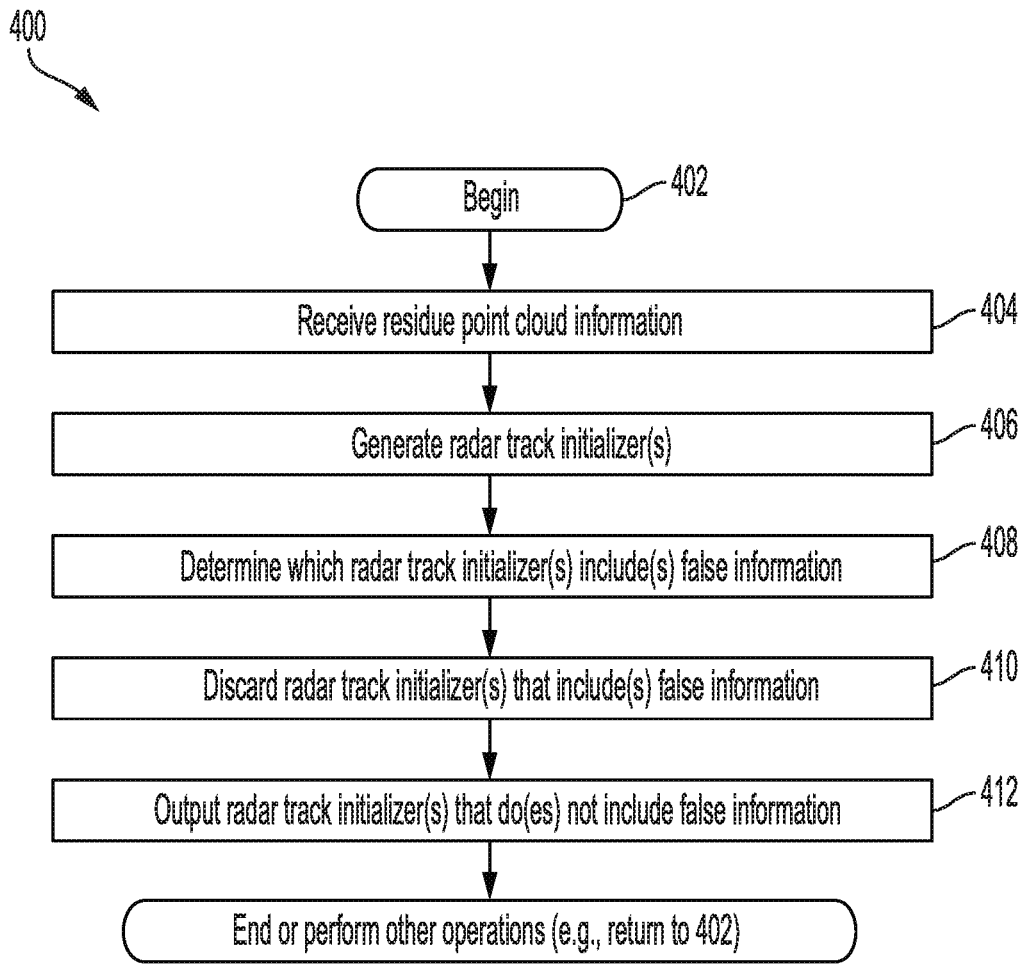
FIG. 4 provides a flow diagram of an illustrative method for determining radar track initializers.

Referring now to FIG. 4, there is provided a flow diagram of an illustrative method 400 for determining radar track initializers. Method 400 can be performed in 318 of FIG. 3. Method 400 is performed to combat false radar tracks. All radar track initializers are considered tentative radar track initializers. The tentative radar track initializers are validated during method 400. Only those radar track initializers that have been successfully validated will be provided to the tracker (e.g., tracker 120 of FIG. 1) for use in generating radar tracks (or spatial descriptions) for newly detected objects.

As shown in FIG. 4, method 400 begins with 402 and continues with 404 where the track initialization module (e.g., module 116 of FIG. 1) receives residue point cloud information (e.g., residue point cloud information 114 of FIG. 1). The residue point cloud information is used in 406 to generate radar track initializers. Techniques for generating radar track initializers are well known in the art. Any known or to be known technique for generating radar track initializers can be used here.

In some scenarios, a track filter is used to generate radar tracks. Each radar track comprises an output of the track filter. The track filter can include, but is not limited to, a Kalman filter, an extended Kalman filter, an unscented Kalman filter, and/or a particle filter. The track filter utilizes a series of measurement data over time to produce an estimate of the variable. The track filter may be initialized on the first detection of an object (or target). The detection produces point cloud information (e.g., point cloud information 108 of FIG. 1), which includes x-coordinate(s), y-coordinate(s), a covariance metric of x and y, a range, a velocity in the x-direction, a velocity in the y-direction, a covariance metric of the velocity in the x-direction, a covariance of the velocity in the y-direction, and/or an azimuth measurement for a detected object. One or more of these listed values are used as input values to initialize the track filter. As such, a radar track initializer can include, but is not limited to, x-coordinate(s), y-coordinate(s), a covariance metric of x and y, a range, a velocity in the x-direction, a velocity in the y-direction, a covariance metric of the velocity in the x-direction, a covariance of the velocity in the y-direction, and/or an azimuth measurement for a detected object. The present solution is not limited in this regard.

Next in 408, the track initialization module performs operations to determine which radar track initializers include false information. The manner in which this determination is made will become evident as the discussion progresses. The track initialization module discards the radar track initializer(s) that is(are) determined to include false information, as shown by 410. The remaining radar track initializer(s) are then output from the track initialization module in 412 (e.g., as track initialization information 118 of FIG. 1). Subsequently, method 400 ends or other operations are performed (e.g., return to 402 or go to 320 of FIG. 3).

Figure 5:
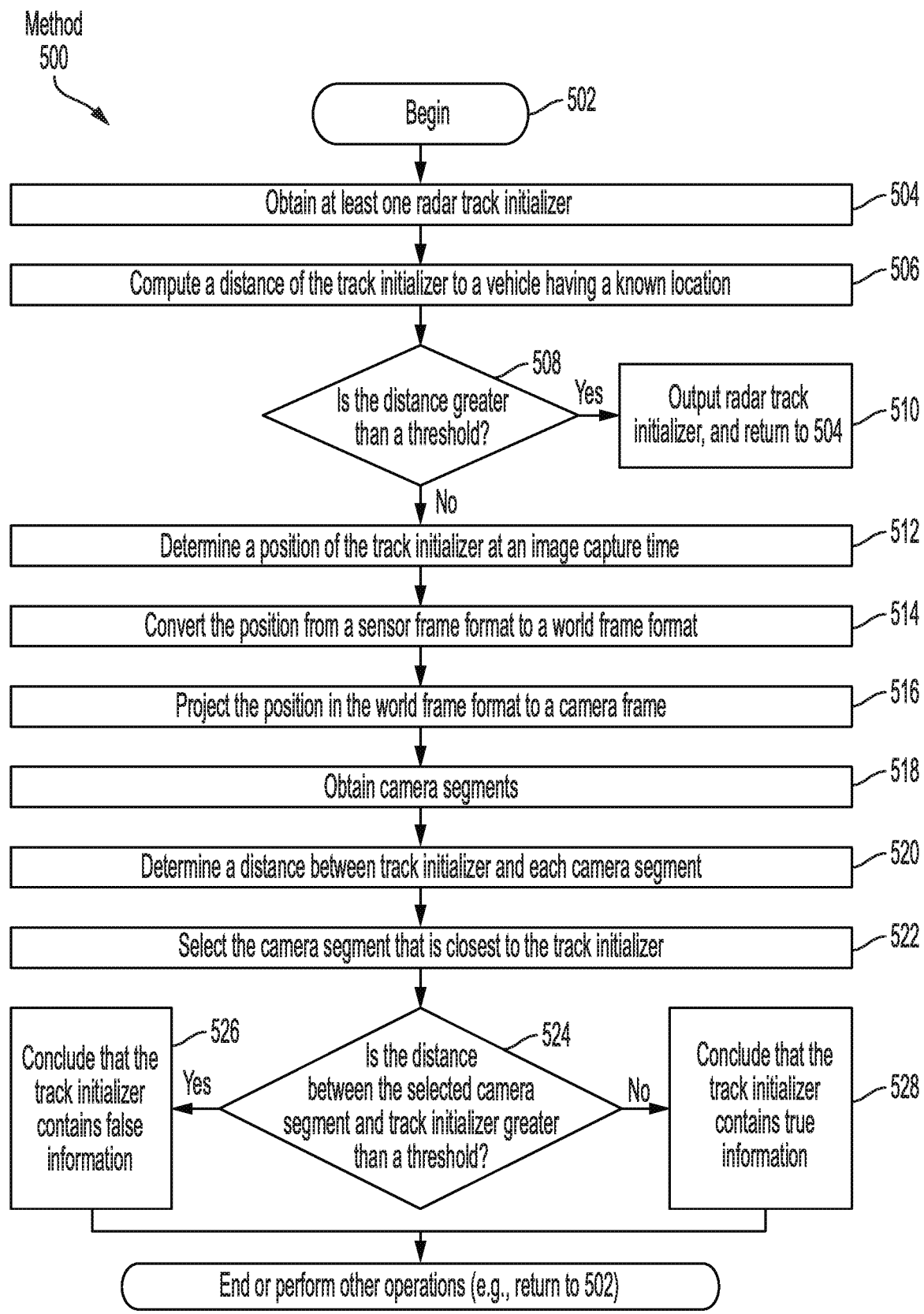
FIG. 5 provides a flow diagram of an illustrative method for determining whether a radar track initializer includes false information FIG. 6 provides an illustration of a system implementing the radar system described in relation to FIGS. 1-5.

Referring now to FIG. 5, there is provided a flow diagram of an illustrative method 500 for determining whether a radar track initializer includes false information. Method 500 can be performed in 408 of FIG. 4.

Figure 7:
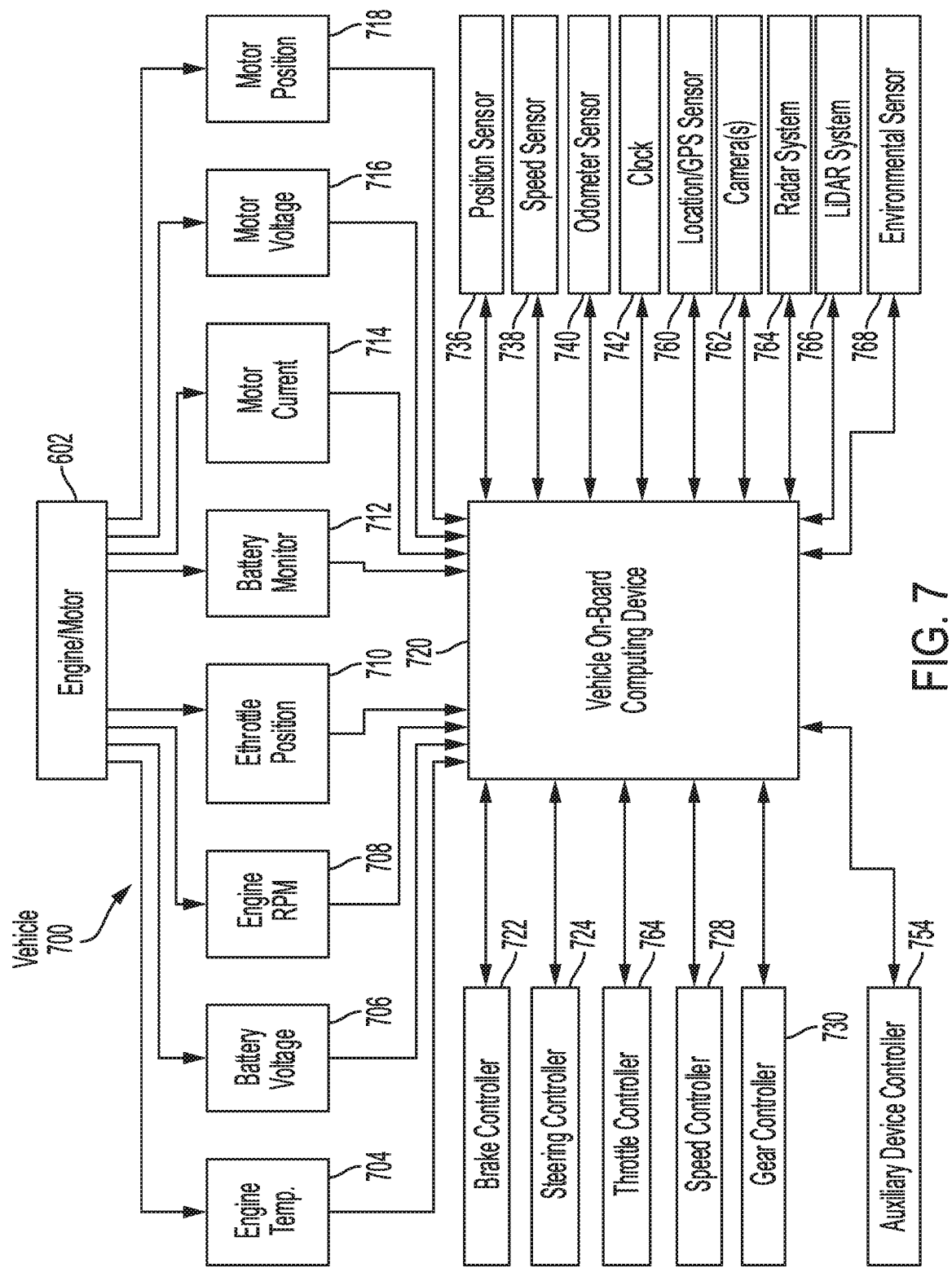
FIG. 7 is an illustration of an illustrative architecture for a vehicle.
Figure 8:
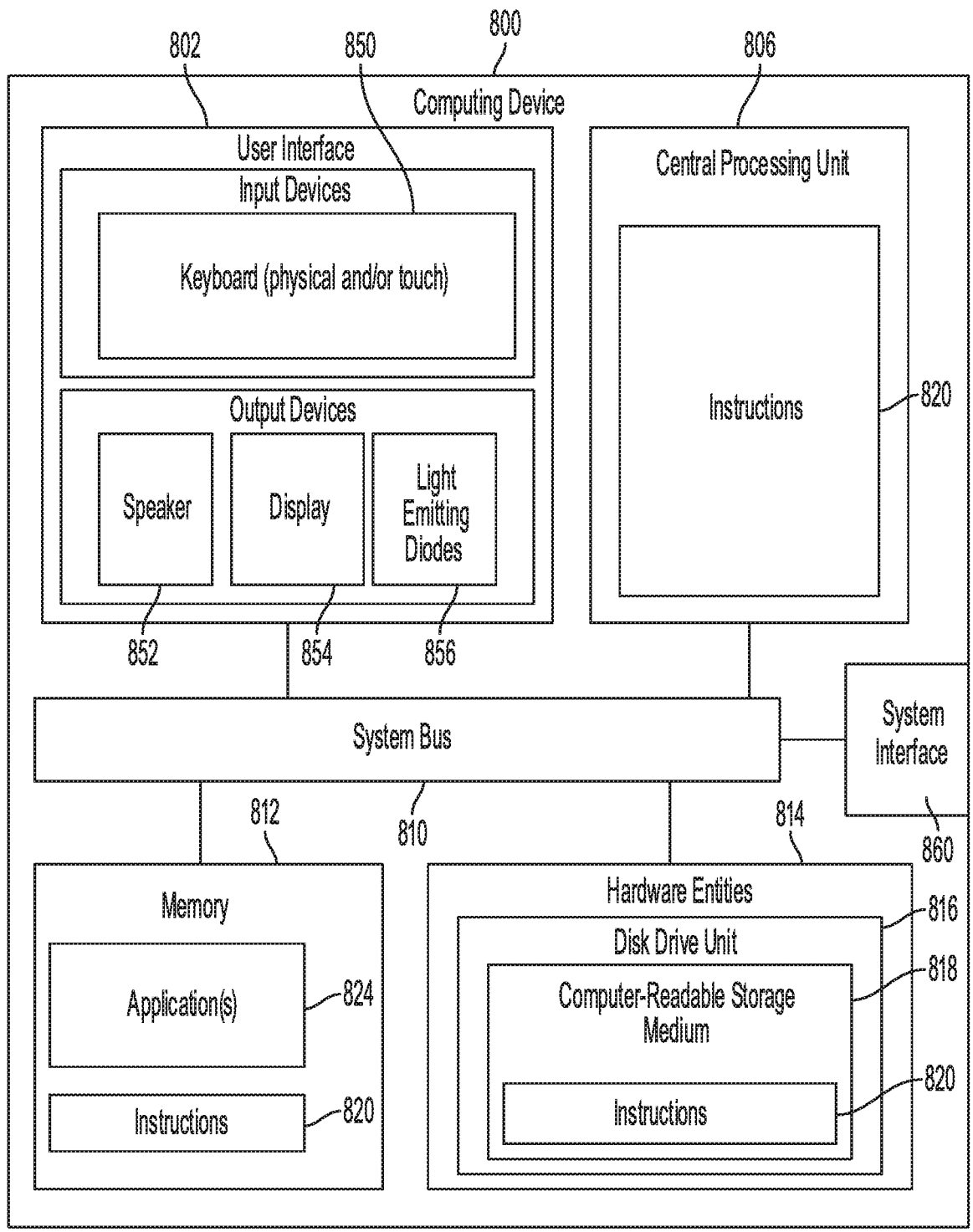
FIG. 8 is an illustration of an illustrative computing device.

As shown in FIG. 5, method 500 begins with 502 and continues with 504 where the track initialization module (e.g., track initialization module 116 of FIG. 1) obtains at least one radar track initializer (e.g., from memory 812 of FIG. 8). Since a radar device (e.g., radar device 102, 104, 106 of FIG. 1) and a camera (e.g., camera 762 of FIG. 7) have different ranging capabilities, the track validation process is not applied to all radar track initializers. In this regard, it should be understood that the camera is associated with a higher degree of trust when the radar track initializer is within a given distance from a vehicle. Threshold comparison operations are performed to determine whether or not the track validation process should be performed on a given radar track initializer. The threshold comparison operations are performed in 506-508 of FIG. 5.

As shown in FIG. 5, 506-508 involve: computing a distance d of the radar track initializer to a known location of a vehicle; and comparing the computed distance d to a threshold $thr_1$. If $d > thr_1$ [508:YES], then the track initialization module concludes that the radar detections and camera detections were not made simultaneously. Thus, the camera information cannot be used to confidently validate the radar track initializer. As such, the track initialization module outputs the radar track initializer and returns to 504 so that method 500 can be performed for a next radar track initializer, as shown by 510.

If $d \leq thr_1$ [508:NO], then the track initialization module concludes that the camera information can be used to confidently validate the radar track initializer. Accordingly, method 500 continues with 512 where the radar track initialization module performs operations to resolve a time misalignment between an image captured by a camera and the radar track initializer. This time misalignment is resolved by compensating a time of the radar track initializer to the image capture time. For example, the radar track initializer includes point cloud information that was generated at time $T_1$, while the image was captured by the camera at a time $T_2$. The position of the radar track initializer at the image's capture time $T_2$ is determined in accordance with the following mathematical equation (1).

$$\text{position}(T_2) = \text{position}(T_1) + \text{velocity} * (T_2 - T_1) \quad (2)$$

where position($T_2$) represents a position of the radar track initializer which includes a modified x-coordinate value and a modified y-coordinate value. velocity is a known value contained in the radar track initializer which can be used for position compensation.

512 can also involve performing a covariance update for the radar track initializer in accordance with the following mathematical equation (3).

$$\text{Covariance}[\text{position}(T2)] = \text{Covariance}[\text{position}(T1)] + (T2-T1)^2 * \text{Covariance}[\text{velocity}] \quad (3)$$

Covariance[velocity] comprises known variable estimates provided by an initializer module.

Upon completing 512, method 500 continues with 514 where the position($T_2$) is converted from a sensor frame format (e.g., a 2D format) to a world frame format (e.g., a 3D format). In the sensor frame format, position($T_2$) includes a 2D position defined by an x-coordinate and a y-coordinate. In the world frame format, position'($T_2$) includes a 3D position defined by an x-coordinate, a y-coordinate and a z-coordinate. The z-coordinate is determined using the position($T_2$) to obtain a ground height value h from a ground surface map. Ground surface maps are well known in the art. Any known or to be known ground surface map can be used here. A pre-defined fixed value A may be added to the ground height value. The pre-defined fixed value A may be selected based on vehicle statistics if the type of object is unknown or may be selected as the exact vehicle height if the type of object is known. This conversion of position($T_2$) into the world frame may be defined by mathematical equation (4).

$$\text{position}'(T_2) = (x, y, h+\Delta) \quad (4)$$

where x represents the x-coordinate value of position($T_2$), y represents the y-coordinate value of position($T_2$), and A is considered a heuristic relative height above the ground surface. In some scenarios, A is selected as half of an average height of all vehicles of a given type (e.g., sedans).

In 516, position (T$_2$) is projected to a camera frame. This projection is straight forward. However, it is not sufficient for radar applications, as radar systems usually have relatively large uncertainties. In this regard, it should be understood that a position estimate may follow a Gaussian distribution with respect to an inferred position. A sigma point or random samples around the xy-plane can be used to expand position'(T$_2$) into one or more positions position'$_0$(T$_2$), position'$_1$(T$_2$), . . . , position'$_{N-1}$(T$_2$), where N is an integer. The positions are defined below.

$$\text{position}'_0(T_2) = (x, y, h + \Delta)$$

$$\text{position}'_1(T_2) = (x + \Delta x_1, y + \Delta y_1, h + \Delta)$$

...

$$\text{position}'_{N-1}(T_2) = (x + \Delta x_{N-1}, y + \Delta y_{N-1}, h + \Delta)$$

where ($\Delta x_N$, $\Delta y_N$) represents a sigma or random sample points from a Gaussian distribution N(0, Σ), and Σ represents a position estimate covariance in two dimensions. The positions position'$_0$(T$_2$), position'$_1$(T$_2$), . . . , position'$_{N-1}$(T$_2$) are then projected into the image frame using a projection algorithm. Each projected position I$_n$ is defined by a u-coordinate and a v-coordinate, as shown below.

$$I_0 = (u, v)$$

$$I_1 = (u_1, v_1)$$

...

$$I_{n-1} = (u_{n-1}, v_{n-1})$$

Projection algorithms for projecting data points from a 3D frame to a 2D frame are well known in the art. Any known or to be known projection algorithm can be used here. For example, a linear projection algorithm, an orthographic projection algorithm or a perspective projection matrix based algorithm is used here. In some scenarios, the projection is achieved in accordance with the following mathematical equation(s).

I=f(position), where f( ) is the projection function that can be chosen by a user based on a given use case preference, position is a position representation in a world frame, and I is a coordinate vector in an image frame. In those or other scenarios, a known camera matrix or (camera) projection matrix is used to describe a mapping of a camera from 3D points in the world frame to 2D points in an image.

In 518, camera segments S$_k$ are obtained by the track initialization module from a datastore (e.g., memory 812 of FIG. 8). Camera segments are well known. Each camera segment represents an object detected in an image, and is defined by a set of data points (p$_1$, p$_2$, . . . , p$_m$) that define a polygon (which may be defined by a plurality of sub-polygons). Each data point has a u-coordinate value and a v-coordinate value associated therewith.

In 520, the track initialization module determines an overall distance d$^k$ overall between the radar track initializer and each of a plurality of camera segments S$_k$. The overall distance d$^k_{overall}$ is generally determined by: determining a distance d(I$_n$, S$_k$) between each projected postion I$_n$ to a given camera segment S$_k$; combining the distances together to obtain an average distance d$^k_{average}$; and setting the overall distance d$^k_{overall}$ equal to the average distance d$^k_{average}$ (i.e., d$^k_{overall}$=d$^k_{average}$). The average distance d$^k_{average}$ can be determined in accordance with the following mathematical equation (5).

$$d^k_{average} = \sum_{n=0}^{N-1} w_1 d(I_n, S_k) \qquad (5)$$

where d(I$_n$, S$_k$) represents a distance from a projected postion I$_n$ to a camera segment S$_k$, and w$_i$ is a normalized weight. The distance d(I$_n$, S$_k$) can be implemented as a Euclidean distance. w$_i$ may be determined in accordance with the following mathematical equation (6).

$$w_i \propto \exp(-0.5 v_i^T \Sigma^{-1} v_i)$$

where $v_i = [\Delta x_i, \Delta y_i]^T$. (6)

In some scenarios, a regular approach is employed for determining the distance d(I$_n$, S$_k$). If the projected postion I$_n$ resides within the polygon of the camera segment polygon S$_k$, then the distance d(I$_n$, S$_k$) is set equal to zero. If the projected postion I$_n$ resides outside of the polygon of the camera segment polygon S$_k$, then the distance d(I$_n$, S$_k$) is computed from the point to the closest polygon over the polygon boundary.

In other scenarios, an enhancement approach is employed for determining the distance d(I$_n$, S$_k$). If the projected postion I$_n$ resides within the polygon of the camera segment polygon S$_k$, then the distance d(I$_n$, S$_k$) is set to a negative number. If the projected postion I$_n$ resides outside of the polygon of the camera segment S$_k$, then the distance d(I$_n$, S$_k$) is set to a positive number.

Referring again to FIG. 5, method 500 continues with 522 where a camera segment is selected. The camera segment that is selected comprises the camera segment that is closest to the track initialize, i.e., has the smallest or minimum overall distance d$_{min}$ of all the overall distances. d$_{min}$ can be defined by the following mathematical equation (7).

$$d_{min} = \min_k d^k_{average} \qquad (7)$$

d$_{min}$ is the minimum distance to the closest camera segment.

In 524, the minimum distance d$_{min}$ is compared to a threshold value thr$_2$. The threshold value thr$_2$ can include a pre-defined fixed value or a value that is dynamically selected based on a distance from the radar track initializer to a vehicle. For example, the value of the threshold value thr$_2$ can linearly increase in value as the distance from the radar track initializer to a vehicle increases or decreases. The present solution is not limited in this regard. If the minimum distance d$_{min}$ is greater than the threshold value thr$_2$ [524: YES], then the track initialization module concludes that the radar track initializer contains false information. If the minimum distance d$_{min}$ is equal to or less than the threshold value thr$_2$ [524:NO], then the track initialization module concludes that the radar track initializer contains true information. Subsequently, 530 is performed where method 500 ends or other operations are performed (e.g., return to 502).

Illustrative Vehicle Based Systems

The above described radar system 100 can be used in a plurality of applications. Such applications include, but are not limited to, vehicle based applications. The following discussion is provided to illustrate how the radar system 100 of the present solution can be used to facilitate control of a vehicle (e.g., for collision avoidance and/or autonomous driving purposes). The vehicle can include, but is not limited to, an autonomous vehicle.

Figure 6:
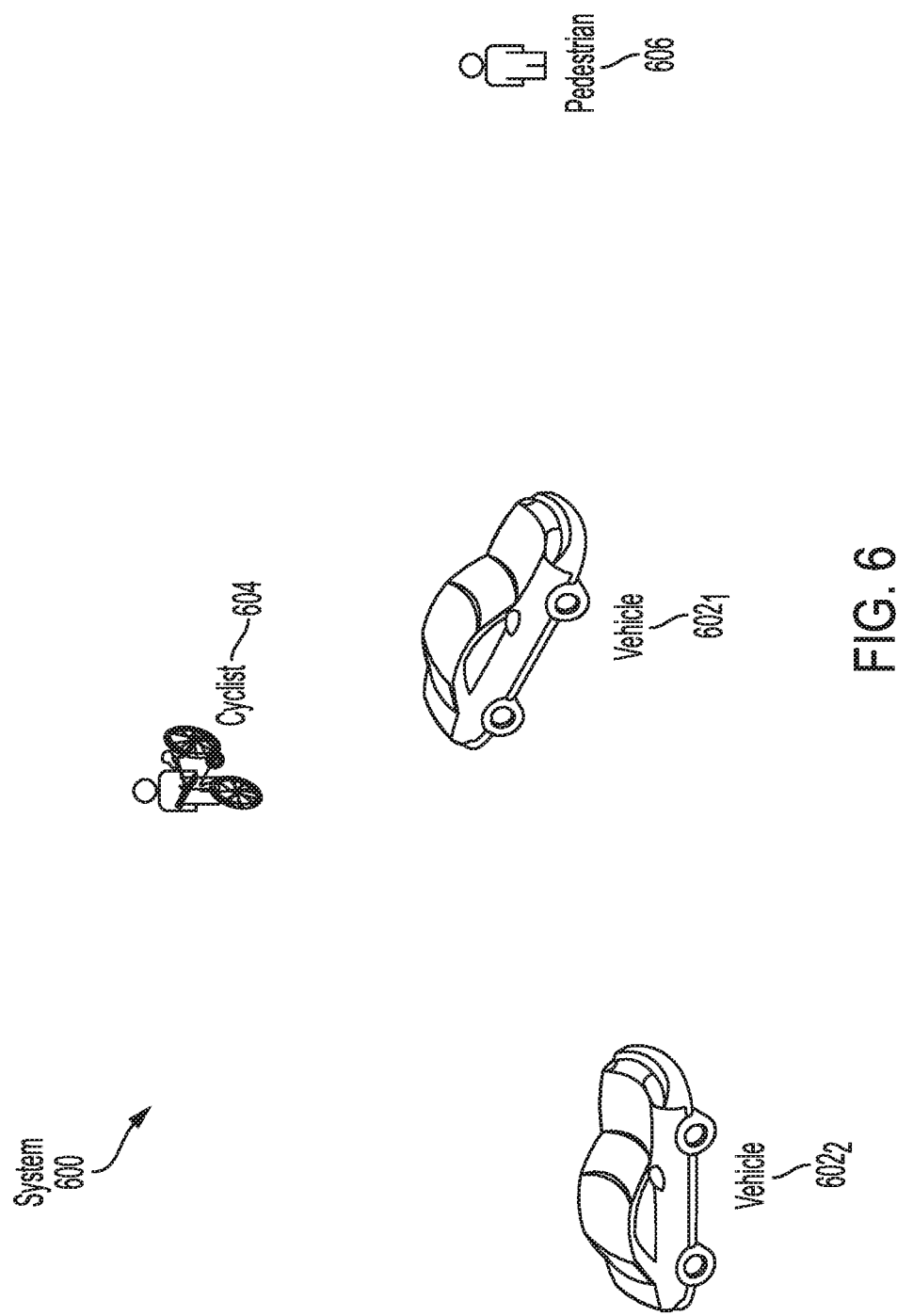

Referring now to FIG. 6, there is provided an illustration of an illustrative system 600. System 600 comprises a vehicle $602_1$ that is traveling along a road in a semi-autonomous or autonomous manner. Vehicle $602_1$ is also referred to herein as an Autonomous Vehicle ("AV"). The AV $602_1$ can include, but is not limited to, a land vehicle (as shown in FIG. 5), an aircraft, or a watercraft.

AV $602_1$ is generally configured to detect objects $602_2$, 604, 606 in proximity thereto. The objects can include, but are not limited to, a vehicle $602_2$, cyclist 604 (such as a rider of a bicycle, electric scooter, motorcycle, or the like) and/or a pedestrian 606. When such a detection is made, AV $602_1$ performs operations to: generate one or more possible object trajectories for the detected object; and analyze at least one of the generated possible object trajectories to determine a vehicle trajectory for AV $602_1$. The AV $602_1$ is then caused to follow the vehicle trajectory.

Referring now to FIG. 7, there is provided an illustration of an illustrative system architecture 700 for a vehicle. Vehicles $602_1$ and/or $602_2$ of FIG. 6 can have the same or similar system architecture as that shown in FIG. 7. Thus, the following discussion of system architecture 700 is sufficient for understanding vehicle(s) $602_1$, $602_2$ of FIG. 6.

As shown in FIG. 7, the vehicle 700 includes an engine or motor 702 and various sensors 704-718 measuring various parameters of the vehicle. In gas-powered or hybrid vehicles having a fuel-powered engine, the sensors may include, for example, an engine temperature sensor 704, a battery voltage sensor 706, an engine Rotations Per Minute (RPM) sensor 708, and a throttle position sensor 710. If the vehicle is an electric or hybrid vehicle, then the vehicle may have an electric motor, and accordingly will have sensors such as a battery monitoring system 712 (to measure current, voltage and/or temperature of the battery), motor current 714 and temperature 716 sensors, and motor position sensors such as resolvers and encoders 718.

Operational parameter sensors that are common to both types of vehicles include, for example: a position sensor 736 such as an accelerometer, gyroscope and/or inertial measurement unit; a speed sensor 738; and an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 760 (e.g., a Global Positioning System (GPS) device); object detection sensors such as one or more cameras 762; a LiDAR sensor system 766; and/or a radar system 764. Radar system 764 is the same as or similar to radar system 100 discussed above in relation to FIGS. 1-5. As such, the above discussion of radar system 100 is sufficient for understanding radar system 764. The sensors also may include environmental sensors 768 such as a precipitation sensor and/or ambient temperature sensor. The object detection sensors may enable the vehicle on-board computing device 720 to detect objects that are within a given distance range of the vehicle 700 in any direction, while the environmental sensors collect data about environmental conditions within the vehicle's area of travel.

During operations, information is communicated from the sensors to the on-board computing device 720. The on-board computing device 720 analyzes the data captured by the sensors, and optionally controls operations of the vehicle based on results of the analysis. For example, the on-board computing device 720 may control: braking via a brake controller 722; direction via a steering controller 724; speed and acceleration via a throttle controller 726 (in a gas-powered vehicle) or motor speed controller 728 (such as a current level controller in an electric vehicle); a differential gear controller 730 (in vehicles with transmissions); and/or other controllers.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the camera(s) 762 and/or object detection information captured from sensors such as LiDAR is communicated to the on-board computing device 720. The object detection information and/or captured images are processed by the on-board computing device 720 to detect objects in proximity to the vehicle 700. Any known or to be known technique for making an object detection based on sensor data and/or captured images can be used in the embodiments disclosed in this document.

When such an object detection is made, the on-board computing device 720 performs operations to: generate one or more possible object trajectories for the detected object; and analyze at least one of the generated possible object trajectories to determine if there is a risk of a collision in a threshold period of time (e.g., 1 minute). If so, the on-board computing device 720 performs operations to determine whether the collision can be avoided if a given vehicle trajectory is followed by the vehicle 700 and any one of a plurality of dynamically generated emergency maneuvers is performed in a pre-defined time period (e.g., N milliseconds). If the collision can be avoided, then the on-board computing device 720 takes no action to change the vehicle trajectory or optionally causes the vehicle 700 to perform a cautious maneuver (e.g., mildly slows down). In contrast, if the collision cannot be avoided, then the on-board computing device 720 causes the vehicle 700 to immediately take an emergency maneuver (e.g., brakes and/or changes direction of travel).

Referring now to FIG. 8, there is provided an illustration of an illustrative architecture for a computing device 800. The data association module 110 of FIG. 1, new radar track initializer generation module 116 of FIG. 1, tracker 120 of FIG. 1, radar system 764 of FIG. 7 and/or vehicle on-board computing device 720 of FIG. 7 is at least partially the same as or similar to computing device 800. As such, the discussion of computing device 800 is sufficient for understanding the data association module 110 of FIG. 1, new radar track initializer generation module 116 of FIG. 1, tracker 120 of FIG. 1, radar system 764 of FIG. 7 and/or vehicle on-board computing device 720 of FIG. 7.

Computing device 800 may include more or less components than those shown in FIG. 8. However, the components shown are sufficient to disclose an illustrative solution implementing the present solution. The hardware architecture of FIG. 8 represents one implementation of a representative computing device configured to operate a vehicle, as described herein. As such, the computing device 800 of FIG. 8 implements at least a portion of the method(s) described herein.

Some or all components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a Central Processing Unit (CPU) 806, a system bus 810, a memory 812 connected to and accessible by other portions of computing device 800 through system bus 810, a system interface 860, and hardware entities 814 connected to system bus 810. The user interface can include input devices and output devices, which facilitate user-software interactions for controlling operations of the computing device 800. The input devices include, but are not limited to, a physical and/or touch keyboard 850. The input devices can be connected to the computing device 800 via a wired or wireless connection (e.g., a Bluetooth® connection). The output devices include, but are not limited to, a speaker 852, a display 854, and/or light emitting diodes 856. System interface 860 is configured to facilitate wired or wireless communications to and from external devices (e.g., network nodes such as access points, etc.).

At least some of the hardware entities 814 perform actions involving access to and use of memory 812, which can be a Random Access Memory (RAM), a disk drive, flash memory, a Compact Disc Read Only Memory (CD-ROM) and/or another hardware device that is capable of storing instructions and data. Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

Figure 9:
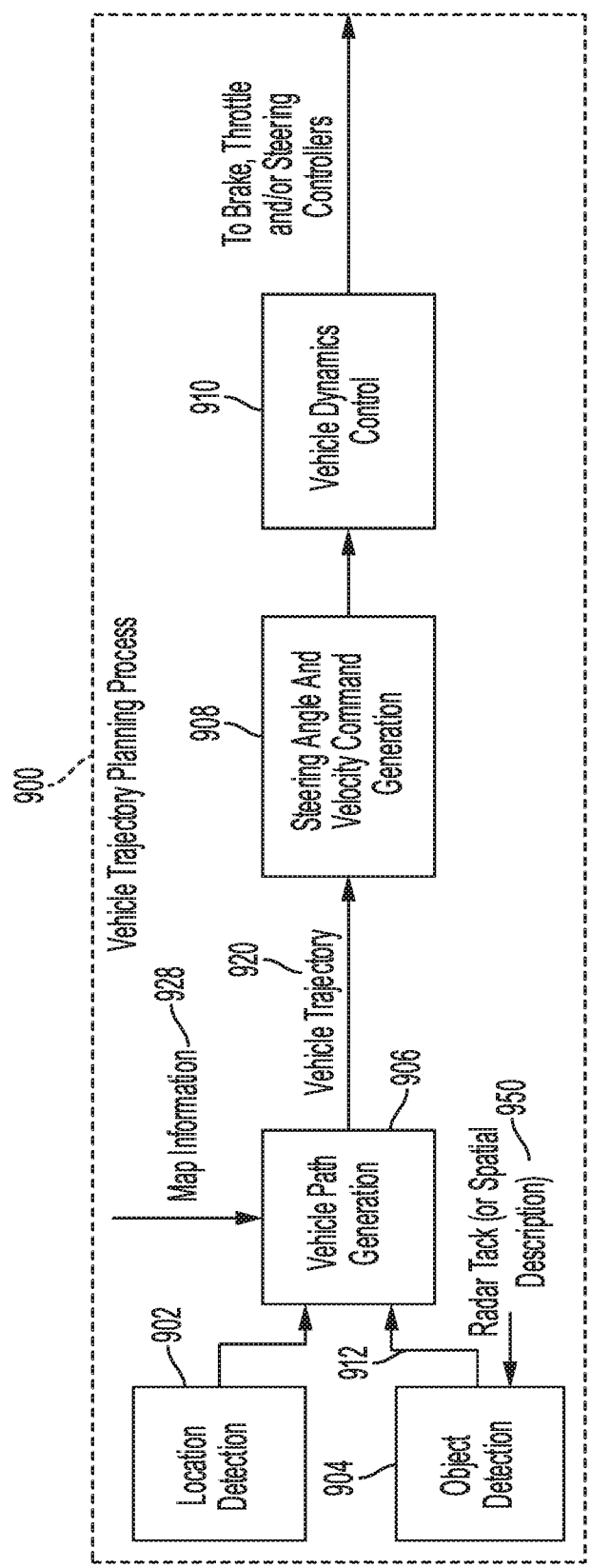
FIG. 9 provides a block diagram that is useful for understanding how control of a vehicle is achieved in accordance with the present solution.

Referring now to FIG. 9, there is provided a block diagram that is useful for understanding how vehicle control is achieved in accordance with the present solution. All of the operations performed in blocks 902-910 can be performed by the on-board computing device (e.g., vehicle on-board computing device 720 of FIG. 7) of a vehicle (e.g., AV 602₁ of FIG. 6).

In block 902, a location of the vehicle is detected. This detection can be made based on sensor data output from a location sensor (e.g., location sensor 760 of FIG. 7) of the vehicle. This sensor data can include, but is not limited to, Global Positioning System ("GPS") data. The detected location of the vehicle is then passed to block 906.

In block 904, an object is detected within proximity of the vehicle. This detection is made based on sensor data output from a radar system (e.g., radar system 100 of FIG. 1, and/or radar system 764 of FIG. 7), a LiDAR system (e.g., a LiDAR system 766 of FIG. 7) and/or a camera (e.g., camera 762 of FIG. 7) of the vehicle. The sensor data output from the radar system includes, but is not limited to, a radar track (or spatial description) 950 for the object. The track (or spatial description) 950 is the same as or similar to radar track (or spatial description) 122 or 124 of FIG. 1. The sensor data is also used to determine one or more possible object trajectories for the detected object. The possible object trajectories can include, but are not limited to, the following trajectories:

- a trajectory defined by the object's actual speed (e.g., 1 mile per hour) and actual direction of travel (e.g., west);
- a trajectory defined by the object's actual speed (e.g., 1 mile per hour) and another possible direction of travel (e.g., south, south-west, or X (e.g., 40°) degrees from the object's actual direction of travel in a direction towards the AV) for the object;
- a trajectory defined by another possible speed for the object (e.g., 2-10 miles per hour) and the object's actual direction of travel (e.g., west); and/or
- a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 912 is(are) then passed to block 906.

In block 906, a vehicle trajectory 920 is generated using the information from blocks 902 and 904. Techniques for determining a vehicle trajectory are well known in the art, and therefore will not be described herein. Any known or to be known technique for determining a vehicle trajectory can be used herein without limitation. In some scenarios, the vehicle trajectory 920 is determined based on the location information from block 902, the object detection/trajectory information from block 904, and map information 928 (which is pre-stored in a data store of the vehicle). The map information 928 can include, but is not limited to, a 3D road map. The vehicle trajectory 920 represents a smooth path that does not have abrupt changes that would otherwise provide passenger discomfort. The vehicle trajectory 920 is then provided to block 908.

In block 908, a steering angle and velocity command is generated based on the vehicle trajectory 920. The steering angle and velocity command is provided to block 910 for vehicle dynamics control. The vehicle dynamics control cause the vehicle to decelerate, cause the vehicle to accelerate, and/or cause the vehicle to change its direction of travel.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a radar system, comprising:
    receiving, by a processor, point cloud information;

generating, by a processor, a radar track initializer using the point cloud information;

determining, by a processor, whether the radar track initializer includes false information based on a distance between the radar track initializer and at least one camera segment;

generating, by a processor, a radar track for a detected object when a determination is made that the radar track initializer does not include false information; and using, by a processor, the radar track to control operations of a vehicle.

2. The method according to claim 1, further comprising discarding the radar track initializer when a determination is made that the radar track initializer includes false information.

3. The method according to claim 1, further comprising computing a distance from the radar track initializer to a known location of the vehicle.

4. The method according to claim 3, further comprising comparing the distance to a threshold value.

5. The method according to claim 4, wherein the determining is performed when the distance is equal to or less than the threshold value.

6. The method according to claim 1, wherein the determining comprises:
   determining a first position of the radar track initializer at an image capture time;
   converting the first position from a sensor frame format to a world frame format to obtain a second position; and
   projecting the second position to a camera frame.

7. The method according to claim 6, further comprising using the projected second position to determine a distance between the radar track initializer and each of a plurality of camera segments.

8. The method according to claim 7, further comprising selecting a camera segment from the plurality of camera segments that is closest to the radar track initializer.

9. The method according to claim 8, further comprising determining whether a distance between the radar track initializer and the selected camera segment is greater than a threshold value.

10. The method according to claim 9, further comprising concluding that the radar track initializer contains false information when the distance is greater than the threshold value.

11. A system, comprising:
   a processor; and
   a non-transitory computer-readable storage medium comprising programming instructions that are configured to cause the processor to implement a method for operating a radar system, wherein the programming instructions comprise instructions to:
   receive point cloud information;
   generate a radar track initializer using the point cloud information;
   determine whether the radar track initializer includes false information based on a distance between the radar track initializer and at least one camera segment;
   generate a radar track for a detected object when a determination is made that the radar track initializer does not include false information; and
   use the radar track to control operations of a vehicle.

12. The system according to claim 11, wherein the programming instructions further comprise instructions to discard the radar track initializer when a determination is made that the radar track initializer includes false information.

13. The system according to claim 12, wherein the programming instructions further comprise instructions to compute a distance from the radar track initializer to a known location of the vehicle.

14. The system according to claim 13, wherein the determination as to whether the radar track initializer includes false information is made when the distance is equal to or less than a threshold value.

15. The system according to claim 11, wherein the determination as to whether the radar track initializer includes false information is made by:
   determining a first position of the radar track initializer at an image capture time;
   converting the first position from a sensor frame format to a world frame format to obtain a second position; and
   projecting the second position to a camera frame.

16. The system according to claim 15, wherein the projected second position is used to determine a distance between the radar track initializer and each of a plurality of camera segments.

17. The system according to claim 16, wherein a camera segment is selected from the plurality of camera segments that is closest to the radar track initializer.

18. The system according to claim 17, wherein a determination is made as to whether a distance between the radar track initializer and the selected camera segment is greater than a threshold value.

19. The system according to claim 18, wherein a conclusion is made that the radar track initializer contains false information when the distance is greater than the threshold value.

20. A non-transitory computer-readable medium that stores instructions that, when executed by at least one computing device, will cause the at least one computing device to perform operations comprising:
   receiving point cloud information;
   generating a radar track initializer using the point cloud information;
   determining whether the radar track initializer includes false information based on a distance between the radar track initializer and at least one camera segment;
   generating a radar track for a detected object when a determination is made that the radar track initializer does not include false information; and
   using the radar track to control operations of a vehicle.

* * * * *